(12) United States Patent
Abbestam et al.

(10) Patent No.: US 6,782,997 B2
(45) Date of Patent: Aug. 31, 2004

(54) DEFLECTING DEVICE FOR CONVEYOR

(75) Inventors: Göran Abbestam, Partille (SE); Andreas Rundqvist, Floda (SE)

(73) Assignee: Flexlink Components AB (SE)

( * ) Notice: Subject to any disclaimer, the term of this patent is extended or adjusted under 35 U.S.C. 154(b) by 0 days.

(21) Appl. No.: 10/332,167

(22) PCT Filed: Jul. 3, 2001

(86) PCT No.: PCT/SE01/01523
§ 371 (c)(1),
(2), (4) Date: Jun. 25, 2003

(87) PCT Pub. No.: WO02/02441
PCT Pub. Date: Jan. 10, 2002

(65) Prior Publication Data
US 2004/0026219 A1 Feb. 12, 2004

(30) Foreign Application Priority Data
Jul. 5, 2000 (SE) .............................................. 0002537

(51) Int. Cl.[7] .............................................. B65G 15/60
(52) U.S. Cl. .................................... 198/841; 198/860.2
(58) Field of Search ............................. 198/841, 860.2

(56) References Cited

U.S. PATENT DOCUMENTS

| | | | | |
|---|---|---|---|---|
| 3,944,054 A | * | 3/1976 | Ensinger ................... 198/860.3 |
| 4,396,112 A | * | 8/1983 | von Wietersheim et al. ..... 198/822 |
| 4,484,674 A | * | 11/1984 | Lunardi et al. .............. 198/332 |
| 4,993,542 A | * | 2/1991 | Nomura ....................... 198/816 |
| 5,186,314 A | * | 2/1993 | Clopton .................... 198/860.2 |
| 5,692,597 A | * | 12/1997 | Ferguson ..................... 198/841 |
| 5,947,264 A | * | 9/1999 | Eltvedt ......................... 198/816 |
| 6,209,715 B1 | * | 4/2001 | Eltvedt ........................ 198/813 |
| 6,422,382 B1 | * | 7/2002 | Ertel et al. ................ 198/860.1 |
| 6,612,426 B1 | * | 9/2003 | Guerra et al. ............. 198/860.2 |

FOREIGN PATENT DOCUMENTS

| EP | 0 203 352 A1 | 12/1986 |
|---|---|---|
| SE | 500 467 C2 | 6/1994 |

* cited by examiner

Primary Examiner—Richard Ridley
(74) Attorney, Agent, or Firm—Lerner, David, Littenberg, Krumholz & Mentlik, LLP

(57) ABSTRACT

Deflecting device for a conveyor, comprising at least one profiled element (10) and deflecting devices (25) and in which a continuous conveyor chain is driven in the profiled element and the said deflecting devices. The profiled element comprises a first guide (11, 11') for the motion of the chain in the direction of a deflecting device and a second guide (12, 12') for the motion of the chain away from the deflecting device. The said at least one deflecting device has a third guide (26, 29, 40) on a pair of mutually opposing wall elements (25) actively connectable to the first and second guides and comprises a part (30", 30") which reverses the motional direction of the chain. Each wall element has a fixture device (30), configured in one piece therewith, for snapping-in of the guide/slide element on both sides of the conveyor.

12 Claims, 6 Drawing Sheets

DEFLECTING DEVICE FOR CONVEYOR

TECHNICAL FIELD

The invention relates to a deflecting device for a conveyor and, more specifically, to a deflecting device for a conveyor having a continuous-running conveyor chain or equivalent.

PRIOR ART

It has long been known to guide continuous conveyor chains in elements which are constructed as profiled elements and support and guide the chain. Such elements are usually extruded profiles and a choice of suitable material offers a wide degree of scope to produce purpose-built elements. One requirement which is stipulated is, of course, adequate strength and optimal extrudability. Aluminium and alloys of aluminium, but also other light metals, have been shown to meet stipulated requirements. By combining a profiled design which is acceptable from the strength aspect with a profile which is necessary for the particular chain guidance, it is possible to achieve a profiled design which is ideal for the purpose.

Continuous-chain conveyors also, of course, require deflecting devices and, in particular, deflecting devices which reverse the motional direction of the chain from a first direction to a second, opposite direction.

Such deflecting devices are traditionally made by casting of a plurality of separate elements, which can somehow be joined together and connected to the said profiled elements. The construction elements in the deflecting device are usually also made of aluminium or some other metal having sufficient strength and durability for the purpose.

These deflecting devices are configured to accommodate a deflecting roller and, in certain cases, a combined deflecting and drive roller.

Apart from strength requirements, dimensional tolerance requirements are also, of course, stipulated to allow the chain to be introduced into the deflecting device and turned and reintroduced into the profiled element without disturbance. These requirements have traditionally been met with the use of separately made supporting guides which, in an extra manufacturing stage, have been fixed to walls which cover the chain of the deflecting device on both sides.

Another essential requirement of extruded conveyor elements and deflecting devices is that they should produce minimal friction against the chain. This has traditionally been solved by the application of slide rails made of suitable material to supporting guides in profiled elements and to supporting, separate guides in deflecting devices. Such a material is, for example, polyamide, HD polyethylene or UHW polyethylene.

A number of rigid requirements are therefore placed upon the deflecting device and in order to meet these use has previously been made of a number of separate construction elements, bearing and friction-reducing, and the deflecting device constructed from these. One wish is that a minimal number of assembly operations shall be required at the assembly site. Apart from the fact that assembly is time-consuming and therefore costly, incorrectly performed part-assembly/assembly can result in failure to obtain the intended functioning and working life. In manufacturing terms, each separate part-production entails increased costs.

Stockholding of separate components is a further costly factor.

In the deflecting device, the conveyor chain is turned from one motional direction to the opposite direction and it is very important that the guide should cope with the forces generated without any displacement or change in position of the chain and of bearing/steering elements. In the known devices in which the bearing guide is designed as a separate construction element, incorrect assembly can result in operating faults. Although these may not be noticed directly, the working life of the conveyor might be considerably reduced.

OBJECT OF THE INVENTION

The object of the invention is to provide a conveyor having a continuous conveyor chain in which the above-mentioned drawbacks of the known deflecting devices are eliminated.

The deflecting device shall especially be usable in conveyors having continuous conveyor chains, in which the motional direction of the chain is reversed from a first motional direction to an opposite direction and in which the chain parts of the conveyor are also supported and guided at a relatively short distance apart in extruded profiles and by at least one further deflecting device.

THE INVENTION

The said object of the invention is realized with a deflecting device according to that which is set out in Patent claim 1. In the sub-claims are indicated preferred embodiments of the arrangement according to the invention.

BRIEF DESCRIPTION OF THE DRAWINGS

An illustrative embodiment of the invention is shown in the appended drawings, in which.

DESCRIPTION OF THE PREFERRED EMBODIMENT

Figure 1:
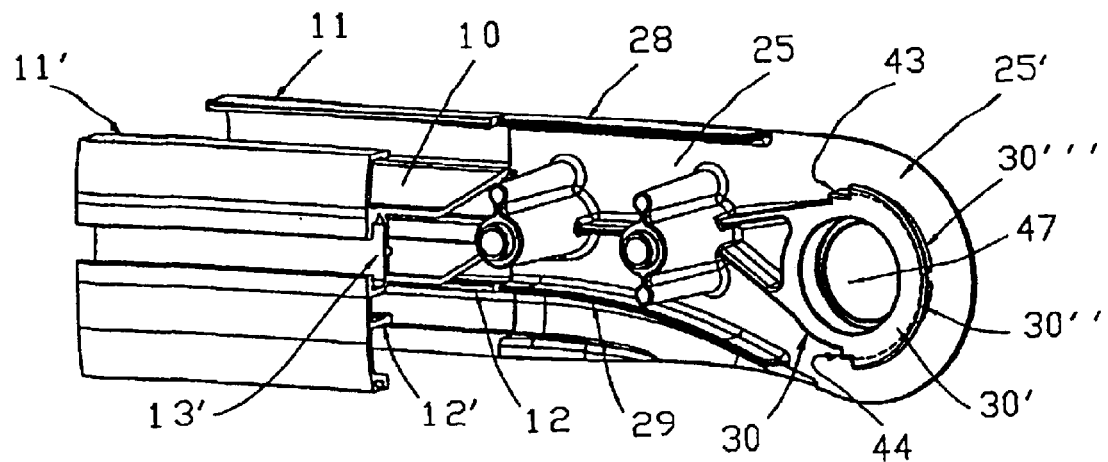
FIG. 1 shows in perspective view part of a deflecting device according to the invention, mounted on a profiled element in which the conveyor chain is supported and guided.
Figure 4:
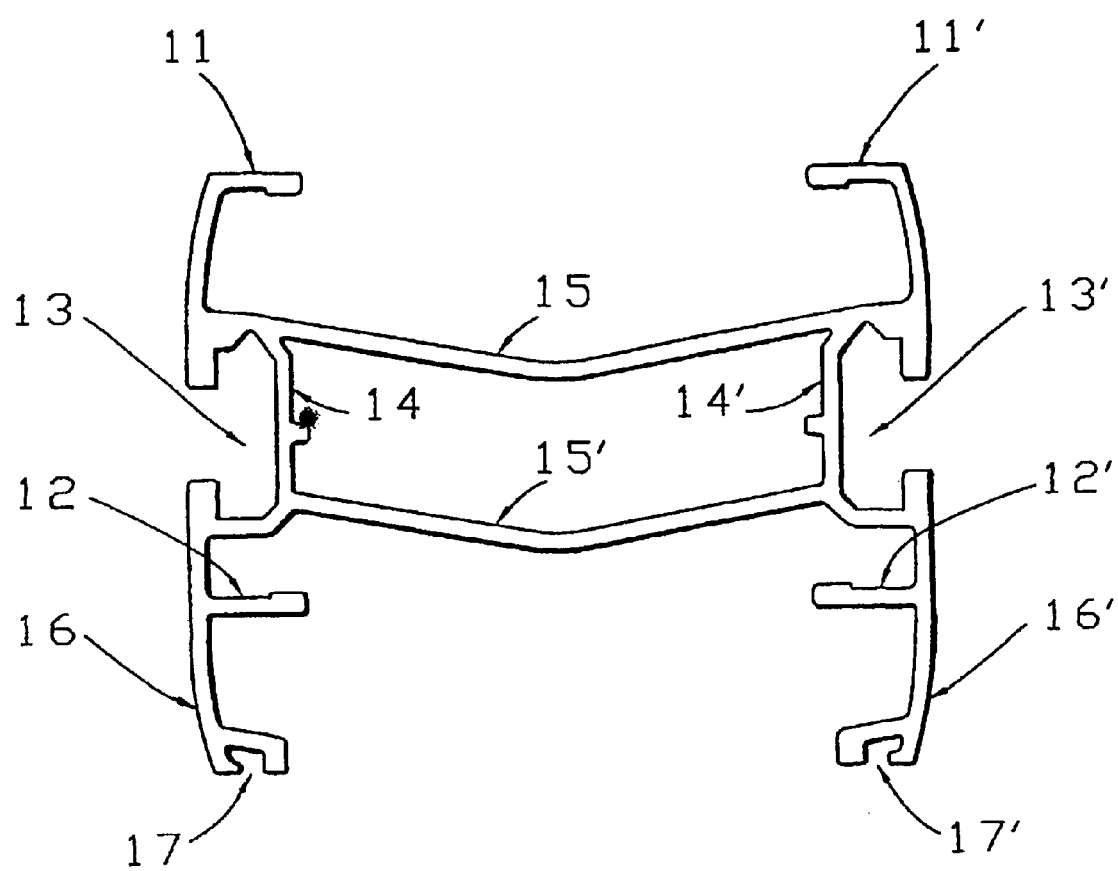
FIG. 4 shows in cross section the profiled element in the conveyor in FIG. 1.

In FIG. 1 is shown part of a profiled element 10, which can be of any chosen length and which is extruded from, preferably, aluminium in the form of a straight girder. The structure of this girder can be seen from FIG. 4. As is evident from the figure, the girder is symmetrical about its vertical centre plane and has a pair of mutually opposing flanges 11, 11' forming a first supporting and steering guide for the conveyor chain. The girder also has a pair of mutually opposing flanges 12, 12' forming a second supporting and steering lower tramway for the conveyor chain. The girder additionally has, along each long side, longitudinal recesses or grooves 13, 13', which are each delimited on the inside by webs 14, 14' standing vertically in the figure. These webs 14, 14' form together with webs 15, 15', which run essential horizontally and are angled in the figure, a rotationally rigid and strong girder construction. The essentially vertical walls 16, 16' of the girder, as shown in FIG. 4, are closed off at the bottom by longitudinal grooves 17, 17', in which transverse clamps or the like can be secured, for example for the fastening of legs to support the conveyor.

Figure 2:
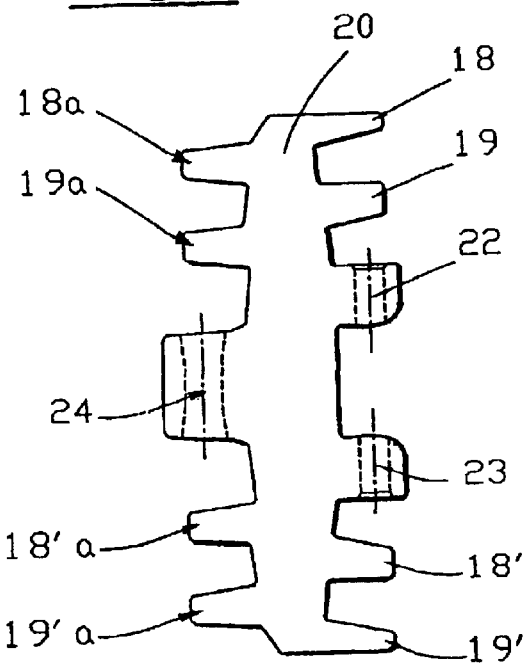
FIG. 2 shows a link of the conveyor chain viewed from above.
Figure 3:
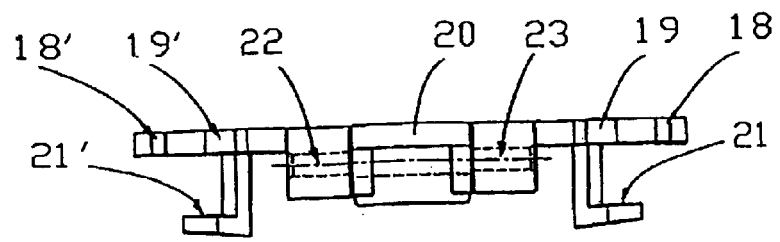
FIG. 3 shows the link in FIG. 2 viewed from the front.

Bearing upon the upper flanges/the first guide 11, 11', (usually) via a slide rail, are the respective outer ends 18, 19, 18a, 19a; 18', 19', 18'a, 19'a of a chain link 20 shown in FIGS. 2 and 3.

On the lower flanges/the second guide 12, 12' the foot-like elements 21 of the chain link 20 are supported in the lower strand of the conveyor chain, i.e. after the motional direction for the chain has been reversed from a first direction along the guide 11, 11' to an opposite direction along the guide 12, 12'. Individual chain links 20 have bores 22, 23, 24 intended to receive pins which flexibly hold together individual links in the plane of the chain as well as perpendicularly thereto.

In FIG. 1 is diagrammatically shown a wall element 25 forming part of a deflecting device according to the invention. The wall element is produced in one piece, preferably by casting of aluminium or another light metal. As can be seen from FIG. 1, the extent of the wall element 25 in the vertical direction essentially corresponds to that of the profiled girder 10. In one piece with the wall element there is configured a connecting piece 26 having a cross section essentially corresponding to the groove 13, 13' in the profiled element and having fastening holes 27 intended to receive screws for tightening against corresponding webs 14, 14'. The wall element 25 has a flange 28, which, in mounted state, constitutes an essentially direct extension of the flange 11. Correspondingly, a flange 29 is present at the bottom of the wall element 25 and this flange, in mounted state, constitutes an essentially direct extension of the lower flange/the first guide 12. Both these flanges 28, 29 are constructed in one piece with the wall element 25 and form part of a third guide in the deflecting device 25.

On the inside of the wall element 25 there is configured in one piece with the wall element a part-circular fixture arrangement 30. This fixture arrangement is, according to the invention, intended to support immovably a guide/slide element 40 (see FIG. 5, FIG. 6). This guide/slide element which can be fixed to the fixture device 30 forms together with the flanges 28, 29, and slide rails (not shown), a third guide for the conveyor chain, i.e. a guide in which the motional direction of the chain is turned from a first direction to the opposite direction.

Figure 5:
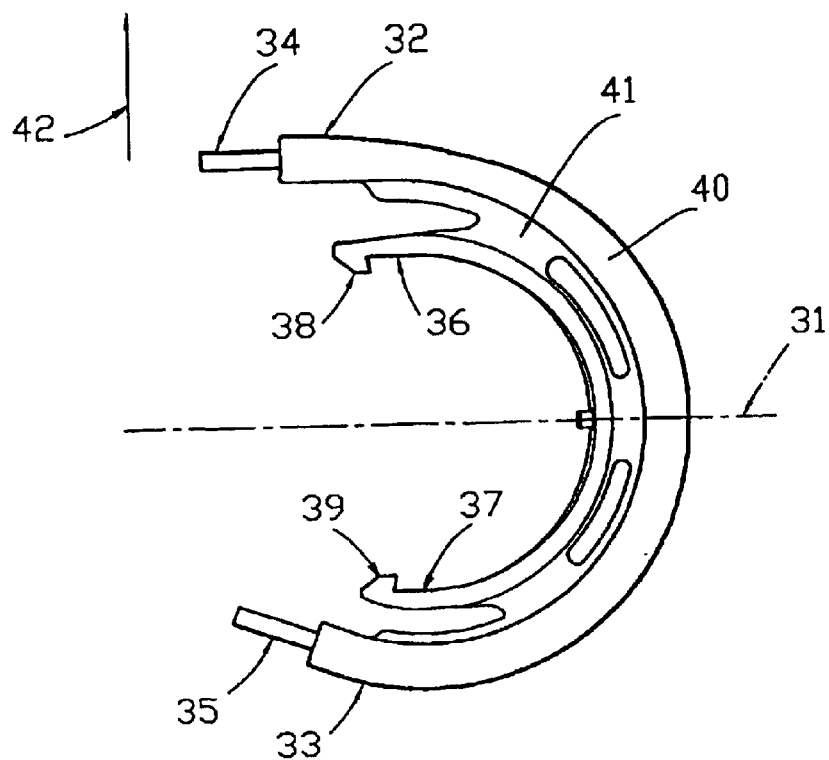
FIG. 5 shows in side view a guide/slide element intended for insertion in the deflecting device in FIG. 1.
Figure 6:
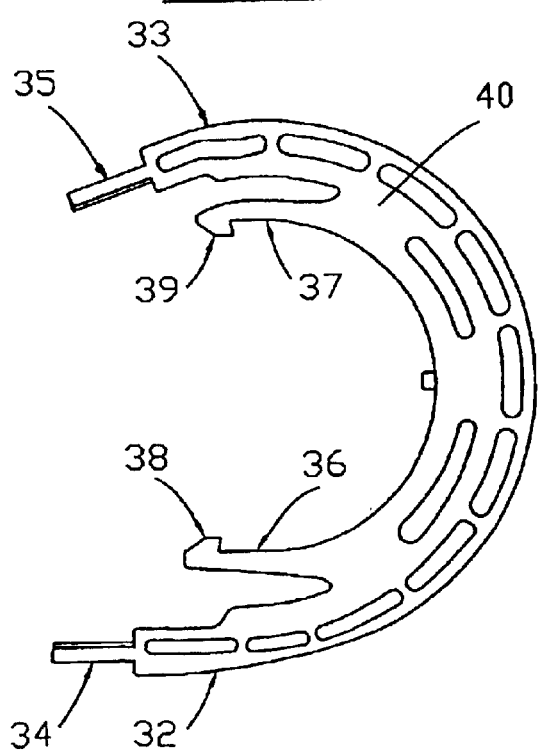
FIG. 6 shows the guide/slide element viewed from the other side.

The guide/slide element 40 is made of low-friction material, for example injection-moulded from polyamide, HD polyethylene or UHW polyethylene, and is essentially U-shaped with the plane of symmetry of the U lying essentially along the line 31 in FIG. 5. The element 40 has a first pair of arm ends 32, 33, in which the arm end 33 has a more curved curvature in relation to the centre plane 31 compared with the arm end 32. The arm ends 32, 33 have sections 34, 35 of reduced material thickness and the top side and bottom side of these sections lie, in mounted state, in the plane of the respective flanges 28, 29. In a radially inward direction in FIG. 5 there is, within the first arm end pair 32, 33, a second arm end pair 36, 37, and each of these arm ends is closed off by a locking lug 38 and 39 respectively. The guide/slide element 40, as already mentioned, is made of low-friction material and, expediently, is injection-moulded from, for example, polyamide, HD polyethylene or UHW polyethylene, and with the shaping shown in FIGS. 5, 6, the arm ends 32, 33; 36, 37 thus acquire flexibility, i.e. they can be flexibly swung out such that they return into position in the plane of the U.

Since the inner arm ends are linked with the outer by a number of webs 41 distributed along the part-circular periphery of the element 40, this means that a force applied in the direction of the arrow 42 in FIG. 5, preferably in this case to the bottom side of the outer end of the arm end 32 and with the locking lugs 38, 39 releasably fixed on the fixture device 30 (as will be described below), or any such force application (especially with due regard to the curvatures of the arm ends 37 and 36), can advantageously be used for the simple release of locking lugs 38 and 39 respectively, which without such force application are securely engaged.

Figure 7:
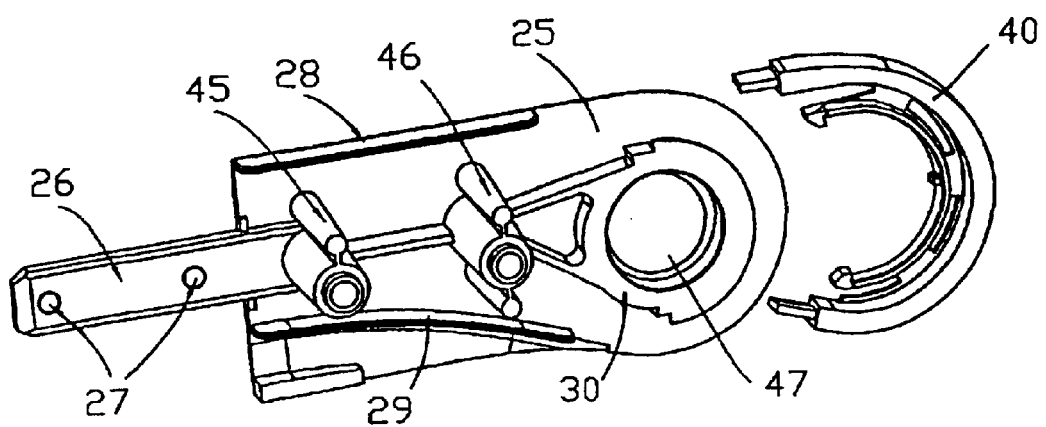
FIG. 7 shows diagrammatically in perspective view a wall element in the deflecting device with the guide/slide element shown by the side thereof.
Figure 8:
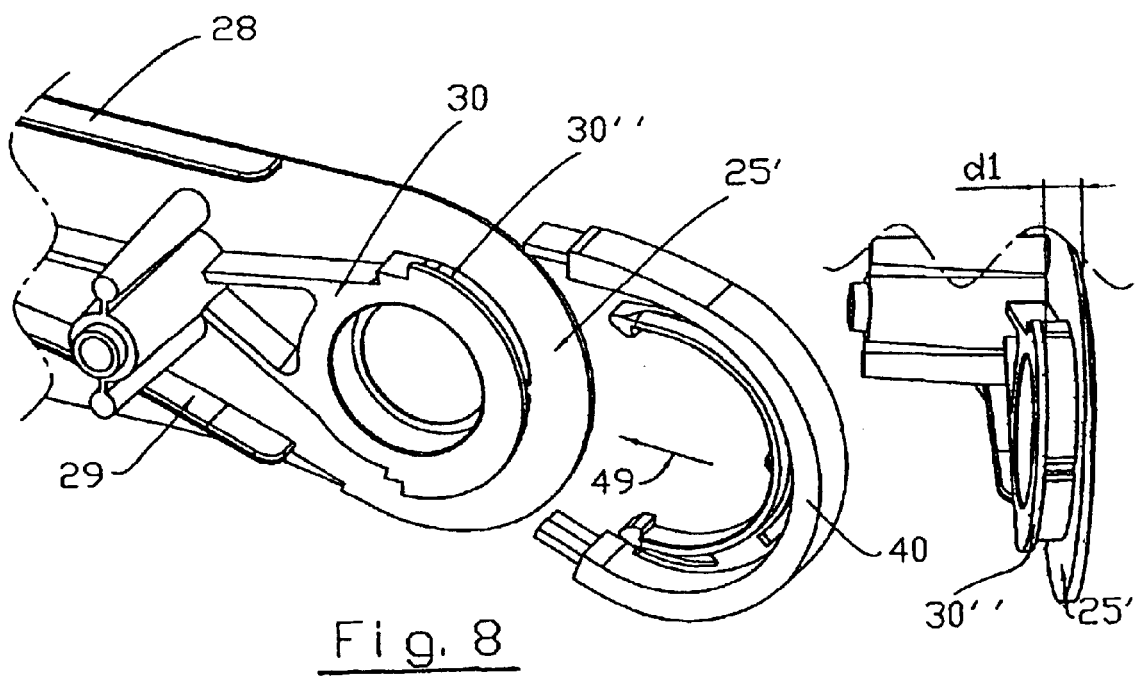
FIG. 8 shows diagrammatically in perspective view the wall element in FIG. 7 and the guide/slide element viewed from a somewhat different angle.
Figure 9:
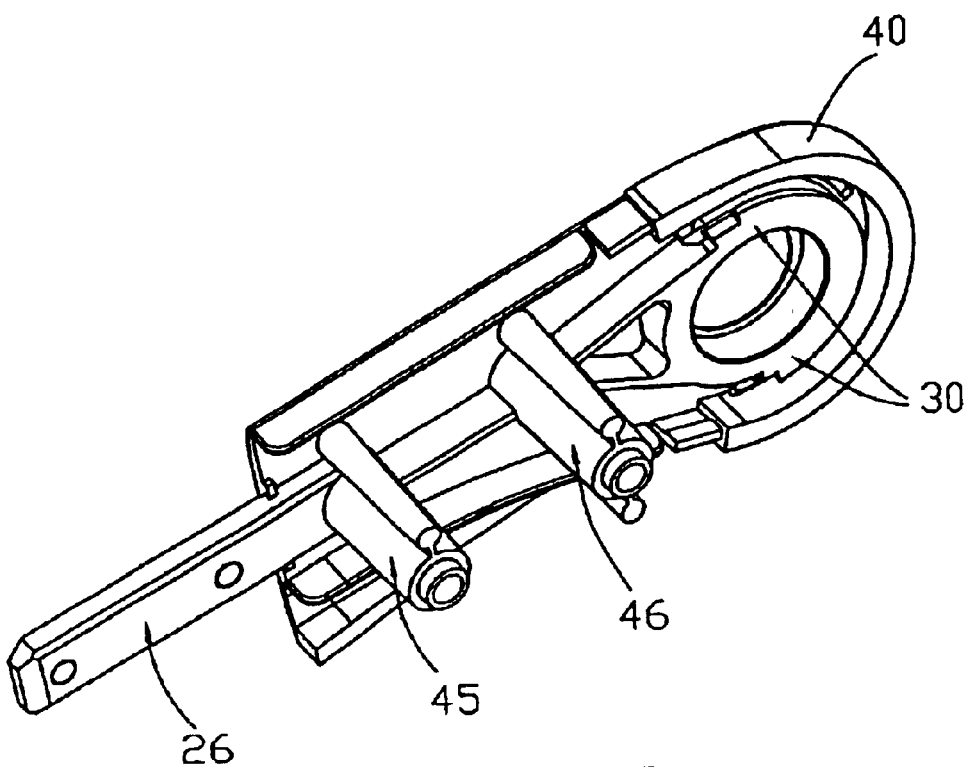
FIG. 9 shows the wall element in FIGS. 7–8 with the guide/slide element applied thereto.
Figure 10:
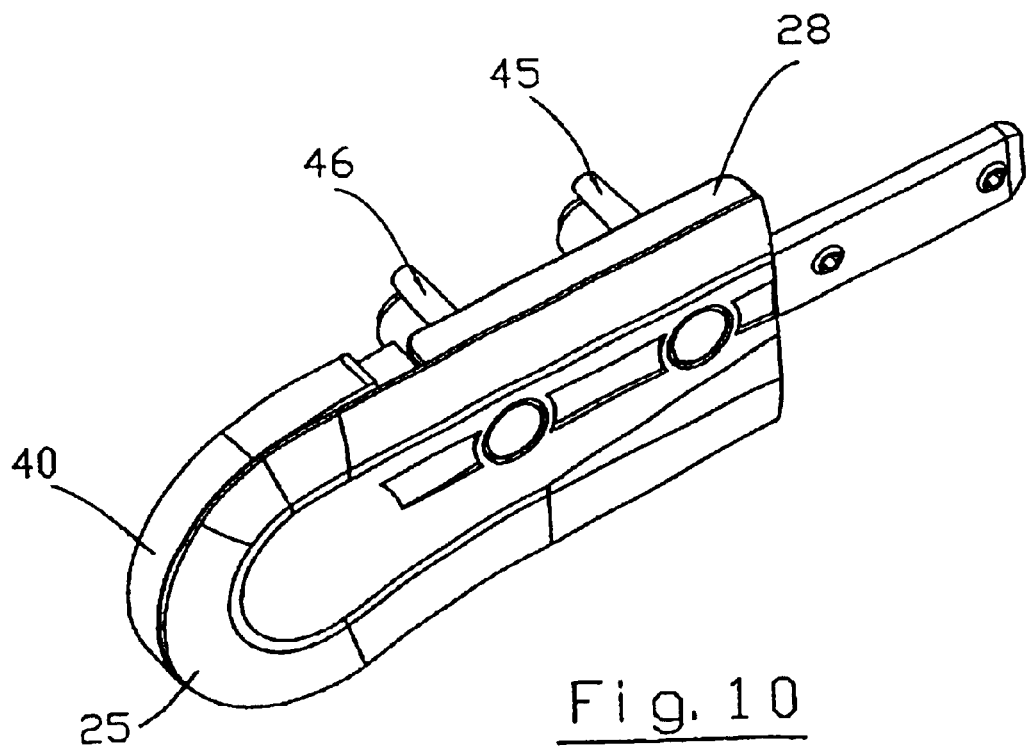
FIG. 10 shows that which is shown in FIG. 9 viewed from the opposite side.
Figure 11:
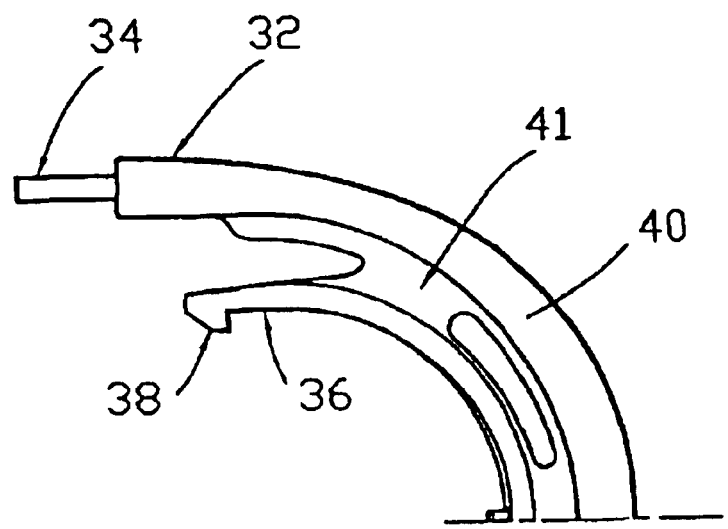
FIG. 11 shows in perspective view the guide/slide element transected in the transverse direction.
Figure 12:
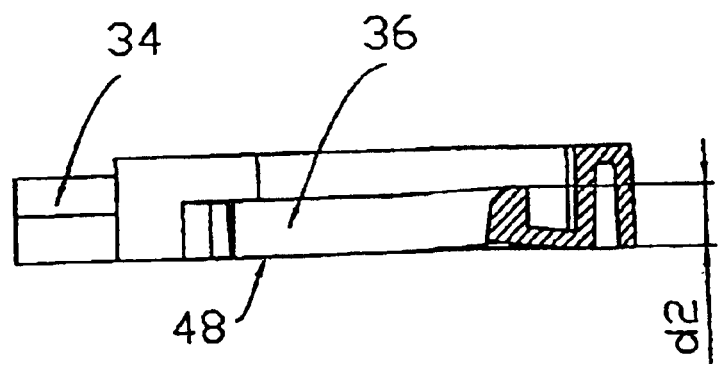
FIG. 12 shows the transected guide/slide element in FIG. 11 viewed from the cut end.

As can be seen from FIGS. 7–9, the guide/slide element is intended to be applied to the fixture device 30 constructed in one piece with the wall element 25. The fixture device 30 has a flat surface 30', which is situated at a distance from the flat surface 25' of the wall element 25, and, as can be seen from FIG. 1, a flange section 30" extends part-circularly out from a part-circular closure 30''' on the solid section of the fixtur device 30. Between the flange 30" and the inside 25' of the wall element 25, therefore, a gap is formed having a gap width $d_1$, indicated diagrammatically in FIG. 8. This gap width $d_1$ is somewhat larger than the measurement $d_2$ which is shown in FIG. 12 and relates to the dimension of the arm ends 36, 37 measured transversely across the said gap. As can be seen from FIG. 12, the bottom sides (intended to bear against the side 25') of the arm ends 36, 37 are also configured to form in the radially inward direction an acute angle with the arm ends 32, 33 and the part which joins these together. The purpose of this will become clear later.

On the fixture device 30 there are locking lugs 43, 44, which can be referred to as the third and fourth locking lugs respectively and which are configured in a complementary manner to the locking lugs 38, 39 on the guide/slide element 40. The gap between the surface 30' and the surface 25' forming the flange 30' is closed off at a distance from the respective locking lug 43, 44. The reason for this is that both the engagement and the release of the locking lugs is thereby facilitated.

The wall element 25 is also provided with coupling devices 45, 46 constructed in one piece and intended to interact with complementary devices on a wall element (not shown) interacting with the wall element 25 and situated opposite the latter. In addition, in the wall element there is configured a space 47 for accommodating a suitable drive device for the conveyor chain. As can be seen from FIG. 7, the guide/slide element 40 is introduced onto the wall element 25 from the end thereof. The locking lugs 38, 39 first meet the gap between the flange 30" and the wall surface 25' and the bottom side 48 of the arm ends 36, 37 will subsequently be pressed downwards in FIG. 12 towards the bottom of the gap 48 as the element 40 continues to be introduced in the direction of the arrow 49. Finally, the locking lugs 38, 39 on the inner arm ends will snap in behind the locking lugs 43, 44 on the fixture device 30 and the guide/slide element is thereby fixed securely in place and bears closely with its surface 48 against the inside 25' of the wall element 25.

Once the element 40 has thus been placed in its position, with the wall element 25 and its connecting piece 26 in place in the groove 13, 13' in the profiled element 10 and with slide rails applied to the respective flanges 28, 29 and flanges 11, 11'; 12, 12' on the profiled element, all that remains is to mount a drive device and to join together two wall elements 25 to form a finished deflecting device.

Even though the invention has been described with reference to a preferred embodiment, it will be appreciated that the inventive is not limited to this. The invention is only limited by that which is stated in the appended patent claims.

What is claimed is:

1. A deflecting device for a conveyor which has a continuous conveyor chain driven by a drive device in a conveyor track, and at least one profiled element and deflecting devices, in which each of said at least one profiled element comprises a first guide for the motion of the chain in the direction of a deflecting device and a second guide for the motion of the chain away from the deflecting device, and the deflecting device has a third guide configured on a pair of mutually opposing wall elements and actively connectable to said first and second guides and comprising a part which reverses the motional direction of the chain, said part which reverses the motional direction of the chain having a pair of fixtures on both sides of the conveyor chain and forming an integral part with the said wall elements, and snap-in guide elements on said fixture.

2. The deflecting device according to claim 1, wherein said guide element is configured in one piece from low-friction material.

3. The deflecting device according to claim 2, wherein said guide element has essentially a U-shape with a pair of first arm ends tailored so as to form with said first and second guides an essentially unbroken guide path for the conveyor chain.

4. The deflecting device according to claim 3, wherein said guide element is made of material which material which enables said first arm ends to be swung out and returned into position in the plane of said U-shape, and wherein said guide element has a further pair of second arm ends, which can be flexibly swung out and returned into position and lie within said first pair of arm ends and which include a first and second locking lug, and wherein on the inside of each of the said wall elements, the said fixture comprises third and fourth complementary locking, which are placed such that the guide element, having swung out and at least partially returned into position, in its mounted state, is held fixed by the corresponding first and third and second and fourth locking lugs respectively.

5. The deflecting device according to claim 4, wherein one of the arm ends in said second pair of arm ends follows a curved path of less curvature than the other of said pair, and including reciprocating fixing surfaces of the locking lugs on the guide element and wall element, respectively, which are guided essentially perpendicularly to the plane of the chain parts, running in opposite directions in the deflecting device, in the mounted state of the conveyor.

6. The deflecting device according to claim 5, wherein the inside of each of said wall elements includes an essentially part-circular fixture edging arranged so as to be enclosed by said second pair of arm ends.

7. The deflecting device according to claim 6, wherein said first pair of arm ends of the U-shaped guide element and a part which joins said first pair of arm ends together comprise a slide rail, which, in the mounted state of the conveyor, connects directly up to corresponding slide rails on an extension part of the deflecting device.

8. The deflecting device according to claim 7, wherein said extension part comprises en integral part of the wall element and has a connecting piece constructed in one piece therewith and dimensioned to be received in fixing function in a correspondingly configured groove in the profiled element.

9. The deflecting device according to claim 8, wherein each of said wail elements has complementary connecting members and a fixing device for deflecting roller and/or chain drive member.

10. The deflecting device according to claim wherein said first pair of arms of the guide element has outer ends of reduced thickness, which form a connecting part to a slide rail on the extension part.

11. The deflecting device according to any claim 1 wherein the wall elements of the deflecting device are each cast in one piece from light metal, preferably aluminium or alloys thereof.

12. A guide element according to claim 1, intended for use in a deflecting device for a continuous conveyor.

* * * * *

UNITED STATES PATENT AND TRADEMARK OFFICE
CERTIFICATE OF CORRECTION

PATENT NO. : 6,782,997 B2
DATED : August 31, 2004
INVENTOR(S) : Göran Abbestam and Andreas Rundqvist It is certified that error appears in the above-identified patent and that said Letters Patent is hereby corrected as shown below:

Column 5,
Line 41, delete "material which" (second instance).

Column 6,
Line 2, after "locking" insert -- lugs --.
Line 26, "en" should read -- an --.
Line 35, after "claim" insert -- 9, --.
Line 39, delete "any".

Signed and Sealed this

Seventh Day of December, 2004

JON W. DUDAS
*Director of the United States Patent and Trademark Office*